United States Patent [19]

Hoyt

[11] Patent Number: 5,009,023
[45] Date of Patent: Apr. 23, 1991

[54] HIGH SPEED FISHING LURE

[75] Inventor: Donald A. Hoyt, Fulton, N.Y.

[73] Assignee: Attacher Lures, Fulton, N.Y.

[21] Appl. No.: 438,864

[22] Filed: Nov. 20, 1989

[51] Int. Cl.$^5$ ............................................. A01K 85/00
[52] U.S. Cl. ...................................... 43/42.5; 43/42.46
[58] Field of Search ................ 43/42.09, 42.22, 42.46, 43/42.47, 42.5, 42.49

[56] References Cited

U.S. PATENT DOCUMENTS

| | | | |
|---|---|---|---|
| 1,862,917 | 6/1932 | Anderson | 43/42.49 |
| 2,463,889 | 3/1949 | Lundemo | 43/42.49 |
| 2,748,523 | 6/1956 | McNabb | 43/42.5 |
| 2,898,700 | 8/1959 | Shillin | 43/42.51 |
| 3,881,271 | 5/1975 | Jacura | 43/42.5 |
| 3,981,096 | 9/1976 | Toivonen | 43/42.5 |
| 4,658,535 | 4/1987 | Anderson | 43/42.5 |
| 4,713,906 | 12/1987 | Distassen | 43/42.5 |
| 4,860,486 | 8/1989 | Vanderplow | 43/42.46 |

*Primary Examiner*—Richard K. Seidel
*Assistant Examiner*—Chuck Y. Mah
*Attorney, Agent, or Firm*—Wall and Roehrig

[57] ABSTRACT

A high-speed spoon-type fishing lure suited for trolling at high speeds, i.e., at least 2½ to 10 knots, without spinning, has a plate body that has a narrow front or leading end to which the line is attached and a wide trailing end to which the hook is attached. The body plate is tapered from front to back so that the trailing end is significantly thicker than the leading end. An attachment eye at the leading end can be laterally elongated to permit play between the lure and an attachment device which attaches the lure to the fishing line or leader.

8 Claims, 1 Drawing Sheet

HIGH SPEED FISHING LURE

BACKGROUND OF THE INVENTION

The present invention relates to a fishing lure, and is especially directed to spoon-type lures in which the lure body is a concave-convex plate of ovate curve shape, narrower at the nose or leading end and wider at the tail or trailing end.

Spoons are often used for trolling in both fresh and salt water. There are many varieties of game fish or sport fish, especially in salt water or on the Great Lakes, that prefer prey fish that swim at high speeds, that is, at 2½ to 7 knots or faster. High speed trolling also gives the fisherman the advantage of covering more area, as well as attracting sport fish that prefer faster swimming prey.

However, the geometry of conventional spoon type lures induces rotation at these speeds. This is undesirable action and does not attract fish as effectively as at lower speeds. Also, the spinning of the lure tends to twist the line on the reel.

A number of approaches have been attempted to add structure to lures for any of a variety of reasons. However, none of these approaches induces sufficient stability for high speed trolling.

Dedrick U.S. Pat. No. 2,740,225 shows a spoon-type lure in which fins are molded or formed onto the lure body for the purpose of reflecting light.

Baum U.S. Pat. No. 2,787,075 has a stabilizing plate or fin mounted onto the metal body of a fishing lure as an anti-spin feature.

Swanberg U.S. Pat. No. 2,586,186 shows a spoon in which

Swanberg U.S. Pat. No. 2,586,186 shows a spoon in which the hook has a knee portion with a steel ball on it to serve as a keel to control oscillatory motion.

Hendrick U.S. Pat. No. 1,885,440 shows a spoon fishing lure whose body is a plate of variable thickness so as to have numerous edges and contours.

Toivonen U.S. Pat. No. 3,981,096 shows a spoon-type lure with blunt front and back edges, and which is thicker at its narrow end and thinner at its wide end. The object of the Toivonen structure is to provide a weighted leading portion to achieve erratic action upon retrieval.

None of these previous designs has been particularly effective for attracting and catching fish at high speeds.

OBJECTS AND SUMMARY OF THE INVENTION

It is an object of this invention to provide a spoon or similar lure that can be trolled or retrieved at high speed.

It is another object of this invention to provide a high speed lure of simple and straightforward geometry.

It is still another object of this invention to provide a fishing lure with an improved attachment eye for attaching to the fishing line or leader, and which will induce directional changes and additional movement of the action.

It is a significant object of this invention to provide a spoon-type lure that simulates the swimming of a prey fish at high speed, thereby catching more fish at high speed trolling than was previously possible.

In accordance with one aspect of this invention, a high-speed spoon-type fishing lure has as the lure body a rounded, elongated metal plate with a narrow leading end and a broad trailing end, and in which the metal plate is of a tapered thickness from front to back so that the trailing end is substantially thicker than the leading end.

The effect of this structure is to concentrate the weight at the trailing end, and this inhibits rotation or spinning at the desired high trolling or retrieval speeds. A hook can be attached onto the metal plate, e.g., by a split ring that passes through an opening or eye at the trailing end of the plate. At the leading end, the metal plate preferably has a laterally elongated eye for permitting side to side play between the lure body and an attachment device at the end of the fishing line or leader. The elongated attachment eye permits the lure to move side to side, providing directional changes and more movement in the lure's action. An elongated eye or slot may also be placed at the rear or trailing end to allow lateral movement of the fishing hooks, and thus also serves as an attraction to game fish.

The laterally elongated attachment eye could be applied to a stick or body bait as well, using a formed strip of wire or other means that duplicates the elongated eye in the spoon lure.

In a preferred embodiment, the metal plate of the lure body is uniformly tapered from front to back, so that the thickness at the trailing end of the lure and the thickness at the leading end are in a ratio of about 2 to 1. This ratio can be varied to alter the action of the spoon. An increase in this ratio will concentrate still more of the weight at the rear part of the lure, so that it can be trolled at still faster speeds without spinning.

The above and many other objects, features and advantages of this invention will be more fully understood from the ensuing description of a preferred embodiment, which should be considered in connection with the accompanying Drawing.

DETAILED DESCRIPTION OF THE PREFERRED EMBODIMENT

Figure 1:
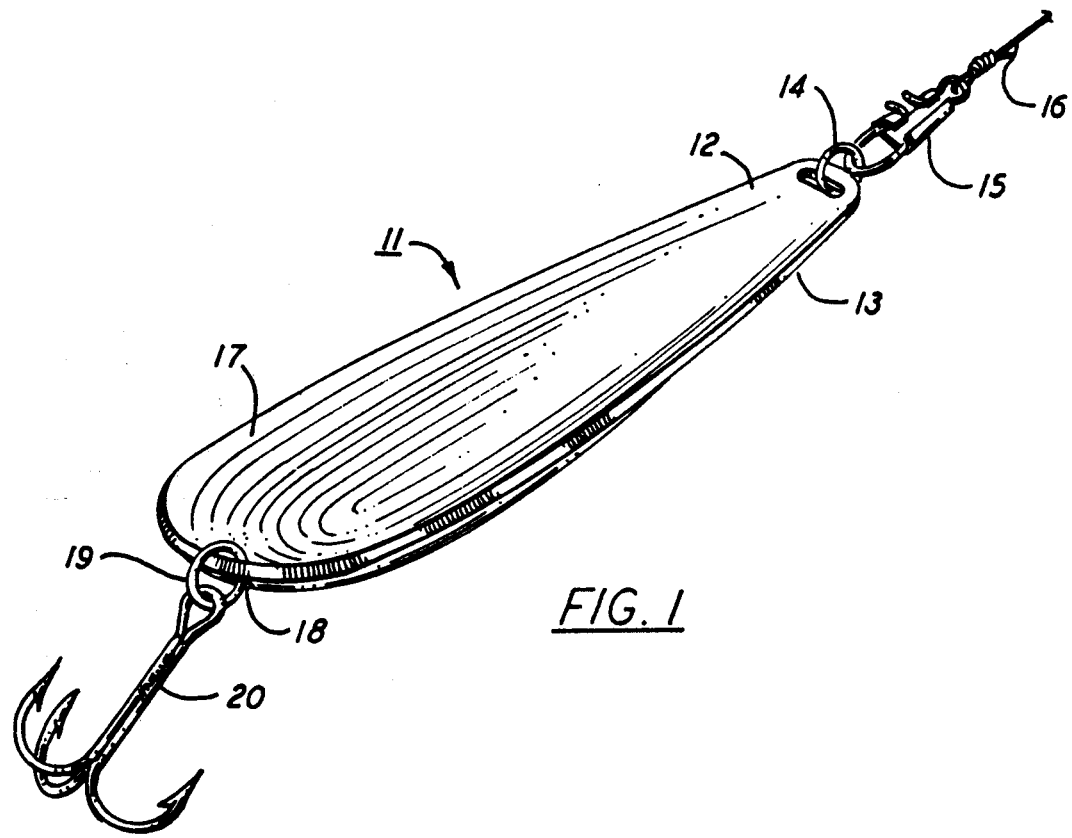
FIG. 1 is a perspective view of a spoon-type lure according to one preferred embodiment of this invention.
Figure 2:
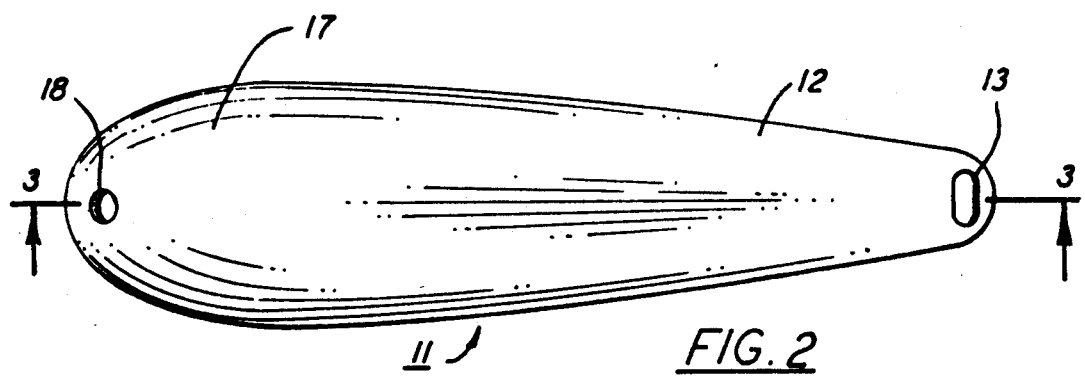
FIG. 2 is a plan view of the lure body of the preferred lure of this invention.

With reference to the Drawing, and initially to FIG. 1, a spoon-type lure 10 has a body 11 in the form of a metal plate. The plate is dished in, that is, concave-convex, and somewhat ovate (having the profile of an egg), as shown in FIG. 2. The body has a leading or front end 12, which is relatively narrow. At the leading end there is a transversely elongated slot or eye 13 for attachment of the body to a fishing line. In this case, there is a split ring 14, passing through the eye 13, and this receives a snap 15 at the end of a fishing leader 16 connecting to a line. A trailing or rear end 17 of the body plate 11 is relatively wider than the leading end 12. At the trailing end there is a round eye 18 through the thickness of the plate 11 through which passes a split ring 19 for attaching a treble hook 20. In other embodiments, a single hook could be used. Also, the hook could be welded or soldered directly onto the lure body 11. In still other possible embodiments, the eye 18 could be laterally elongated to permit side to side play of the hook 20 during trolling or retrieval to add movement to the lure's action.

Figure 3:
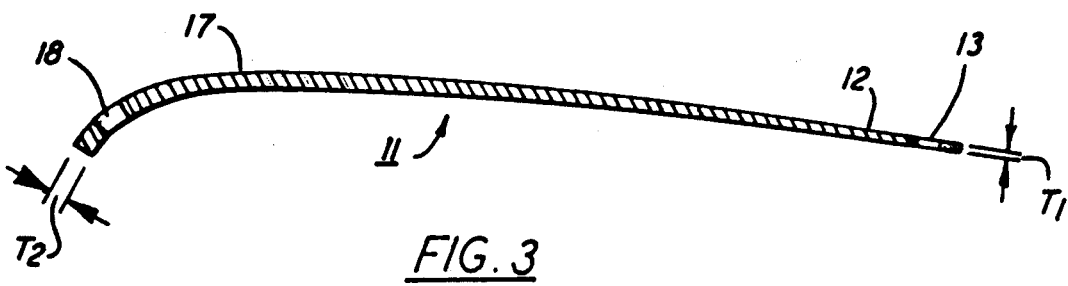
FIG. 3 is a cross section taken at line 3—3 of FIG. 2.

As shown in FIG. 3, the lure has a thickness $T_1$ at its leading end 12 and a greater thickness $T_2$ at the trailing end 17. In the preferred embodiment shown here, the thickness $T_1$ is 1/32", and the trailing end $T_2$ is 1/16". The thickness of the metal plate tapers evenly from front to back, although in other embodiments the plate may taper less gradually. Because the lure body 11 is wider and thicker at the trailing end of the lure, weight is concentrated towards the back and away from the line end. This serves as a stabilizing factor and keeps the lure 10 from spinning, especially at high speeds. For higher trolling speeds, i.e., above about 7 knots, the thickness ratio of the thickness $T_2$ to $T_1$ can exceed the ratio of 2:1 of the disclosed embodiment.

The elongated attachment eye 13 shown here can be employed with other types of lures besides spoons to permit the side to side movement between the lure and the attachment to the fishing line. In the case of stick or body base lures, the attachment eye can be formed of a strip of wire or other means.

The lure 10 of this embodiment is made from a brass blank. However, the lure could instead be formed from other materials and manufactured according to a suitable process.

While this invention has been described in detail with respect to specific preferred embodiments, it should be understood that the invention is not limited to that precise embodiment. Rather, many modifications and variations would present themselves to those of skill in the art without departing from the scope and spirit of this invention, as defined in the appended claims.

What is claimed is:

1. A high-speed spoon-type fishing lure for use at high trolling or retrieval speeds up to at least about 7 knots comprising a rounded, elongated metal plate having a trailing end and a leading end and which is narrower at the leading end and broader at the trailing end, and wherein the metal plate is of tapered thickness from front to back such that the trailing end is substantially thicker than the leading end to concentrate the weight of the metal plate at the thicker, broader trailing end to inhibit rotation or spinning of the lure at said high trolling or retrieval speeds; a hook attached onto said metal plate; and means of said leading end for attaching to a fishing line.

2. The high-speed lure of claim 1 wherein said metal plate is generally ovate in outline.

3. The high-speed lure of claim 2 wherein said metal plate is concave-convex at least at the trailing end thereof.

4. The high-speed lure of claim 1 wherein said metal plate is on the order of twice as thick at its trailing end as at its leading end.

5. The high-speed lure of claim 1 wherein said metal plate tapers in thickness uniformly from the leading end to the trailing end.

6. The high-speed lure of claim 1 wherein said metal plate has a round eye through, and a split ring passing through said eye to which said hook is attached.

7. The high-speed lure of claim 1 wherein said means for attaching to said line includes a laterally elongated eye through said plate at the leading end thereof, said elongated eye having a substantially straight elongated front wall, permitting side-to-side play between the lure and an attachment device at the end of the line.

8. A high-speed spoon-type fishing lure comprising a rounded, elongated metal plate having a trailing end and a leading end and which is narrower at the leading end and broader at the trailing end, and wherein the metal plate is of tapered thickness from front to back such that the trailing end is on the order of twice as thick at its leading end; wherein said metal plate is substantially one-sixteenth inch thick at the trailing end and one thirty-second inch thick at the leading end; a hook attached onto said metal plate; and means at said leading end for attaching to a fishing line.

* * * * *